United States Patent [19]

Huyer

[11] Patent Number: 5,288,125
[45] Date of Patent: Feb. 22, 1994

[54] OPEN ROOF CONSTRUCTION FOR A VEHICLE

[75] Inventor: Johannes N. Huyer, Velserbroek, Netherlands

[73] Assignee: Vermeulen-Hallandia Octrooien II B.V., Haarlem, Netherlands

[21] Appl. No.: 948,665

[22] Filed: Sep. 22, 1992

[30] Foreign Application Priority Data

Oct. 14, 1991 [NL] Netherlands ............ 9101707

[51] Int. Cl.$^5$ .................................. B60J 7/047
[52] U.S. Cl. ...................... 296/216; 296/220; 296/223; 296/224
[58] Field of Search ............ 296/216, 220, 223, 224

[56] References Cited

U.S. PATENT DOCUMENTS

| | | | |
|---|---|---|---|
| 4,647,106 | 3/1987 | Furst | 296/216 X |
| 4,877,285 | 10/1989 | Huyer | 296/223 X |
| 4,995,667 | 2/1991 | Tamura et al. | 296/216 |

FOREIGN PATENT DOCUMENTS

| | | |
|---|---|---|
| 0292730 | 11/1988 | European Pat. Off. . |
| 0296644 | 12/1988 | European Pat. Off. . |
| 0373692 | 6/1990 | European Pat. Off. . |
| 3536184 C1 | 11/1986 | Fed. Rep. of Germany . |
| 2078295A | 1/1982 | United Kingdom . |

*Primary Examiner*—Dennis H. Pedder
*Attorney, Agent, or Firm*—Westman, Champlin & Kelly

[57] ABSTRACT

A spoiler roof for a vehicle having an opening (2) in the fixed roof (1) comprises an adjustable panel (3) and an adjusting mechanism (4) for it. This comprises a transverse pivot shaft (23) pivotally supporting the panel on its front side, and a set-out lever (10) provided at a distance behind this pivot shaft. A catching device (21, 22) positioned backwardly of the set-out lever between the panel and the stationary guide rail (5) may be operatively connected to a drive means (7, 8) for pivoting the panel in the first and last pivoting part from and to the closed position, respectively. The set-out lever comprises a forcing guide (31, 32) which is operative between the set-out lever and the stationary guide rail during at least a part of the pivoting movement of the panel when the catching device is inoperative.

11 Claims, 5 Drawing Sheets

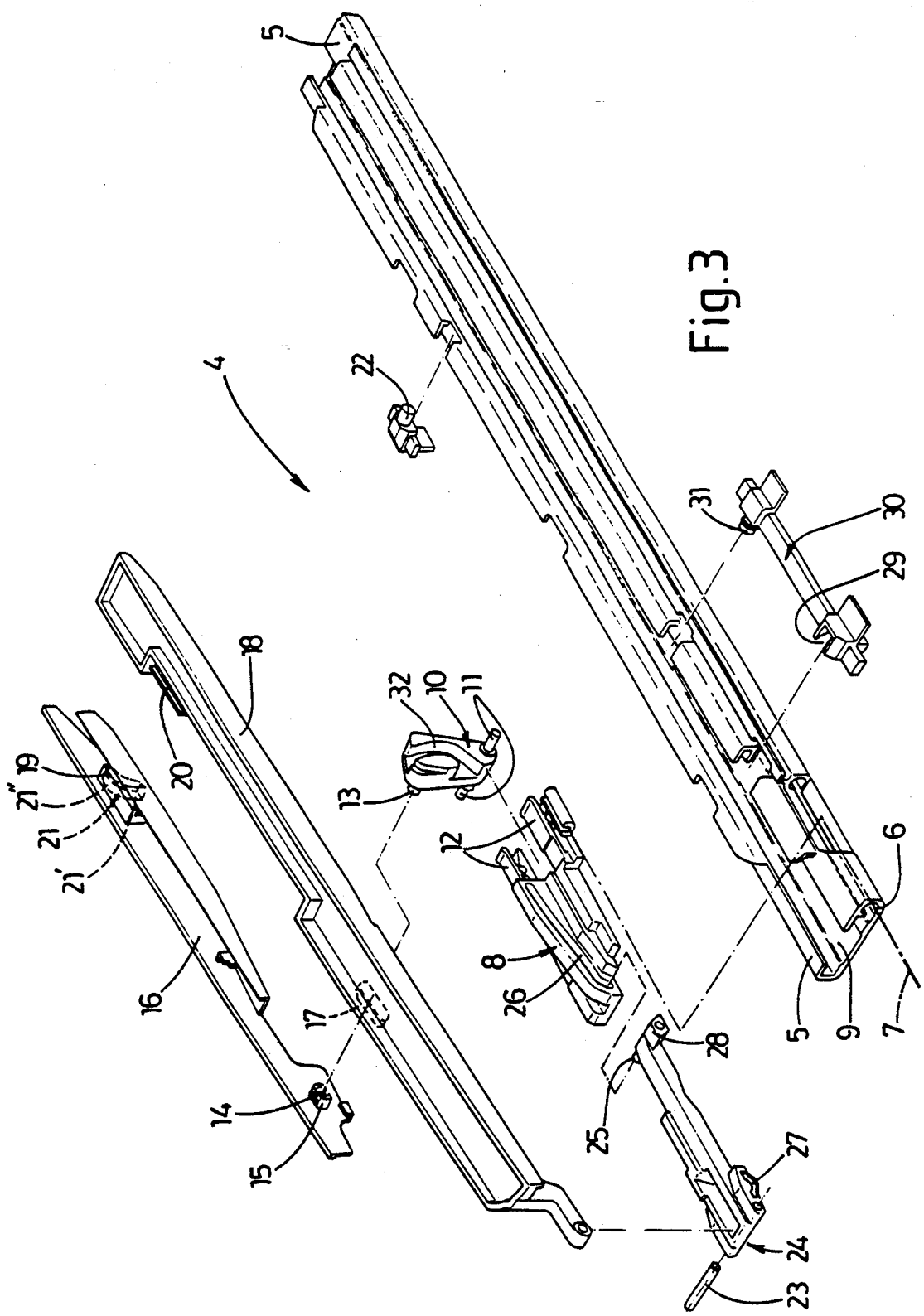

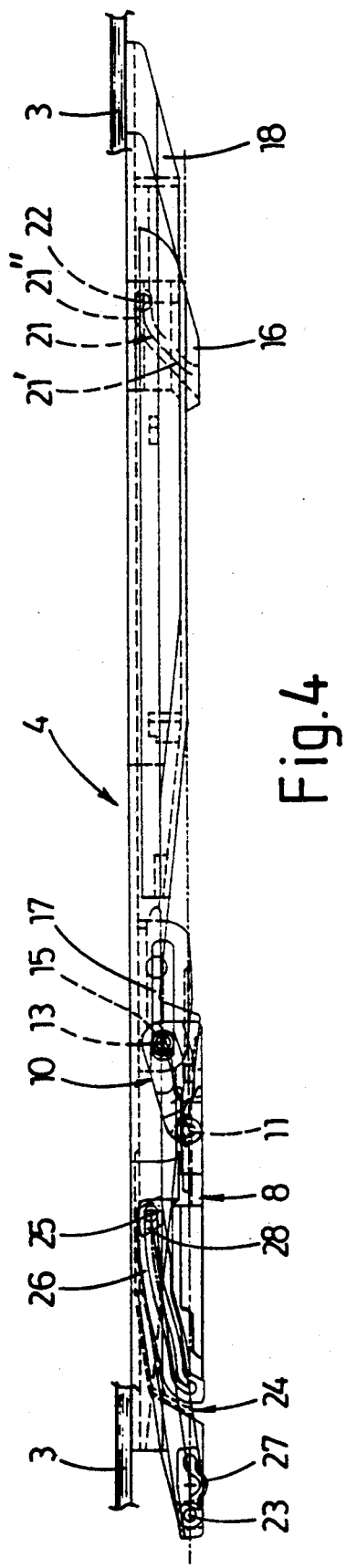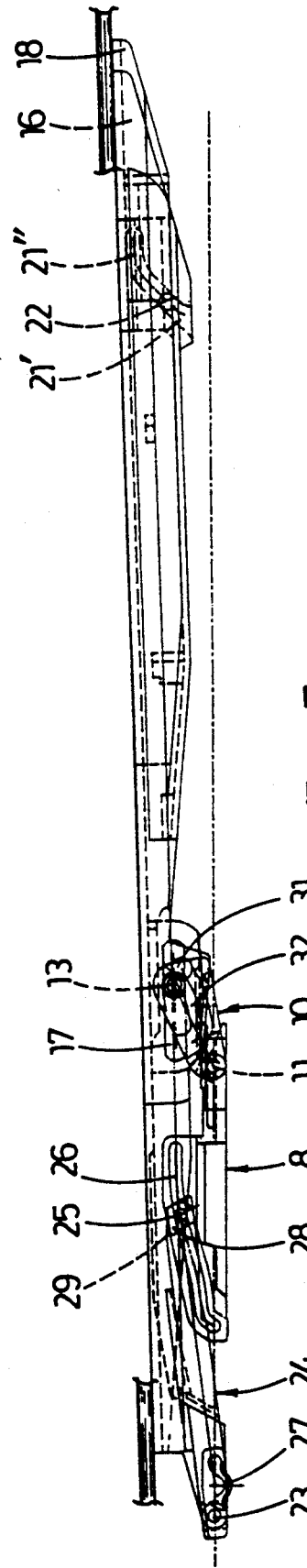

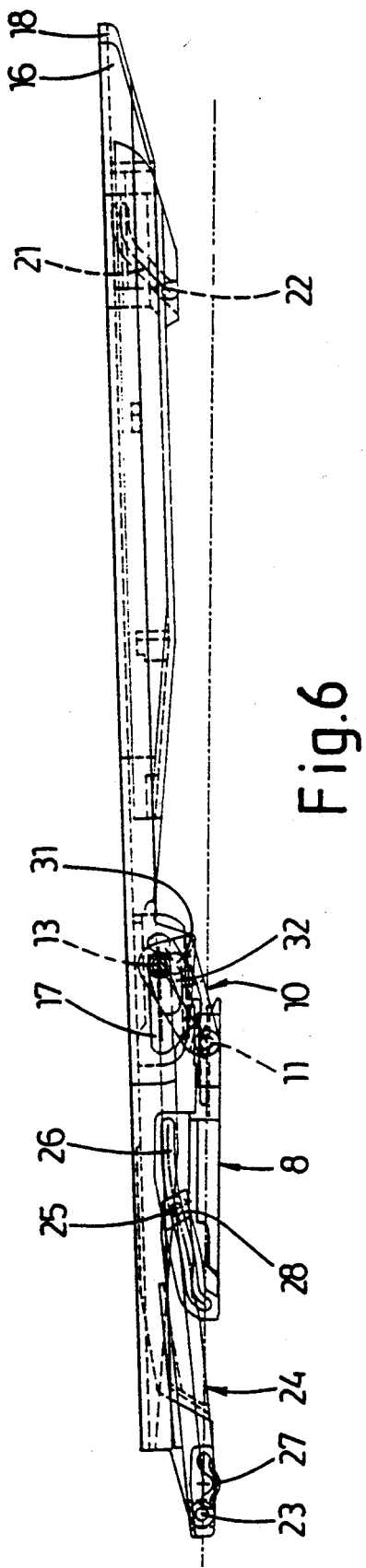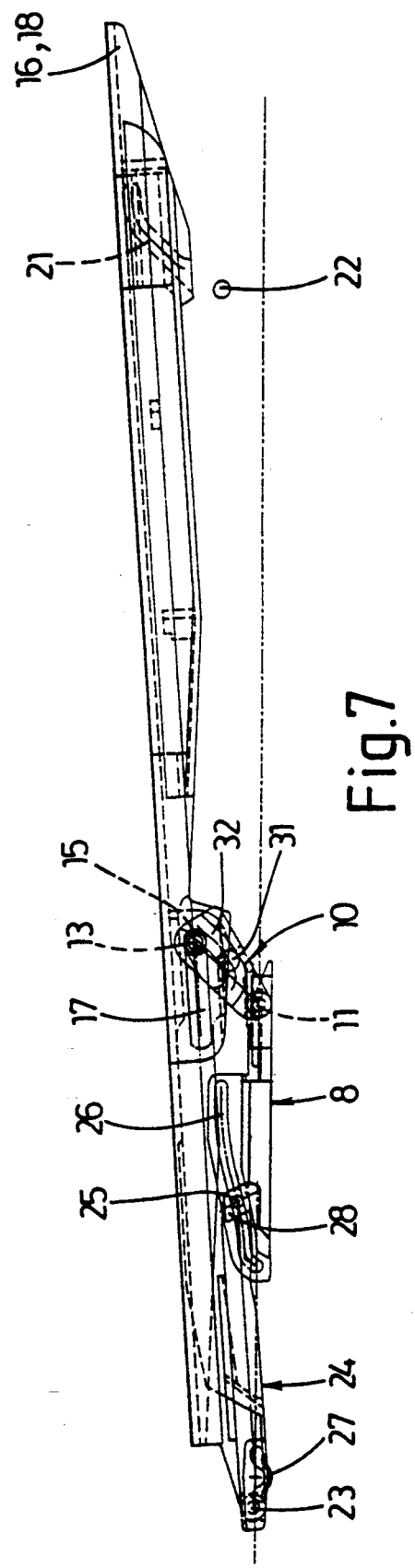

OPEN ROOF CONSTRUCTION FOR A VEHICLE

The invention relates to an open roof construction for a vehicle having an opening in the fixed roof, comprising an adjustable panel closing the opening in the fixed roof in its closed position and being adapted to be moved first to a backwardly and upwardly inclined position and then backwardly to positions above the fixed roof by means of an adjusting mechanism, the adjusting mechanism including a transverse pivot shaft pivotally supporting the panel at its front side, a set-out lever spaced backwardly from the pivot shaft, the set-out lever being at least pivotally connected to the panel on the upper end and being at least pivotally in driven connection with a driving slide on its lower end, the driving slide being slidably guided within a stationary guide rail extending in longitudinal direction of the vehicle and engageable by driving means, a catching device positioned backwardly of the set-out lever between the panel and the stationary guide rail, and adapted to be operatively connected to the driving means for pivoting the panel in the first and last pivoting part from and to the closed position, respectively.

An open roof construction of this type is known from EP-A-0 296 644. There, the construction is such that when the panel is opened from the closed position the catching device is first operatively coupled to the driving slide, while the driving slide is non-drivingly connected to the set-out lever, whereafter the driving slide of the catching device is uncoupled and comes operatively into engagement with the set-out lever. The set-out lever is then pivoted upwardly as a result of the lower pivoting point of the lever being pushed backwardly while the upper pivoting point is only allowed to move upwardly with the panel. A disadvantage of this construction is that at the time the catching device becomes inoperative the set-out lever is in a relatively flat position, whereby vertical forces acting on the panel cause an unfavorable load on the set-out lever which has an adverse influence on stability.

The object of the present invention is to provide an open roof construction of the type mentioned in the preamble, wherein this disadvantage is removed in an effective way.

For this purpose the open roof construction according to the invention is characterized in that the set-out lever includes a forcing guide which is operative during at least a part of the pivoting movement of the panel when the catching device is inoperative.

Due to this forcing guide the set-out lever experiences an additional support thereby increasing the stability of the set-out lever and consequently of the panel support. This also provides the possibility of positioning the set-out lever further forward with respect to the panel, as a result of which the panel may be moved further backwardly so that a larger portion of the roof opening may be opened. Furthermore, when opening the panel, the set-out lever may take over the function of the catching device at an earlier point so that the catching device needs to effect only a little pivoting movement of the panel and may consequently be kept low which has a favorable effect on the building height of the whole open roof construction.

The invention will hereafter be elucidated with reference to the drawing showing an embodiment of the invention by way of example.

FIG. 3 shows an enlarged perspective exploded view of the parts of the adjusting mechanism for effecting the opening and closing movements of the panel of the open roof construction of FIGS. 1 and 2.

FIGS. 4-10 show in a sectional view similar to FIG. 2 the cooperation of the parts of FIG. 3 for obtaining the different positions of the panel, wherein the guide rail is omitted for the sake of clarity.

Figure 1:
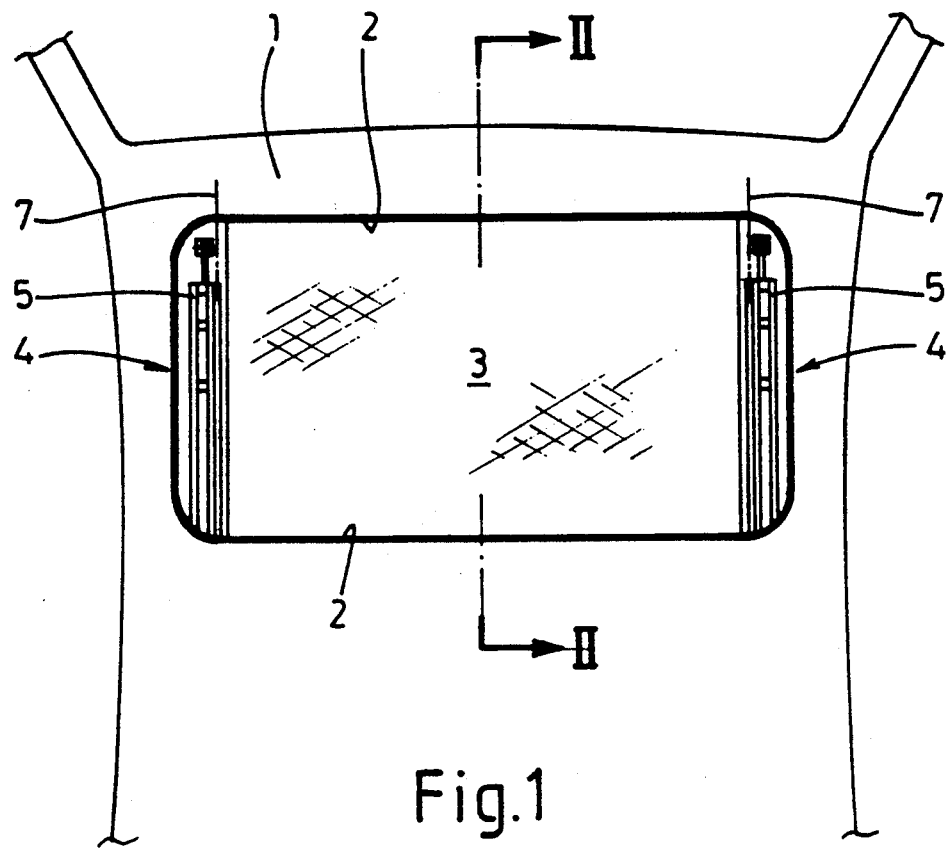
FIG. 1 is a plan view of a portion of a vehicle roof having therein an open roof construction according to the invention.
Figure 2:
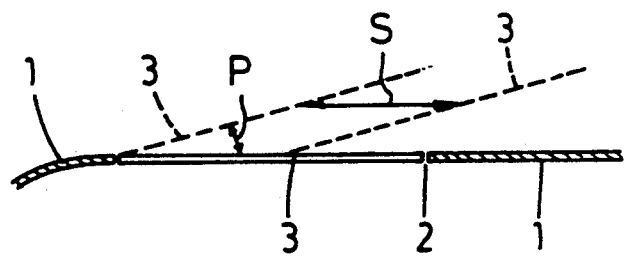
FIG. 2 is a very schematic sectional view along the line II—II of FIG. 1, illustrating the possible movements of the panel of the open roof construction.

Referring now to the drawing and first of all to FIGS. 1 and 2, there is shown an open roof construction for a vehicle, such as a passenger car, of which the fixed roof 1 is provided with an opening 2. The open roof construction comprises a preferably transparent rigid panel 3 which closes the opening 2 in the fixed roof 1 in its closed position and which is adapted, by operation of an adjusting mechanism 4 provided on both longitudinal sides of the panel 3, first to be pivoted to a backwardly and upwardly inclined position (arrow P in FIG. 2) from the closed position and then to be moved backwardly to positions above the fixed roof 1 (arrow S in FIG. 2). From this open position the panel may be moved back again to the closed position.

FIG. 3 shows one of the adjusting mechanisms 4 on one side of the panel 3 (not shown). The adjusting mechanism 4 includes a stationary guide rail 5 extending in longitudinal direction of the vehicle near the respective longitudinal side of the roof opening. The guide rail 5 comprises a guide track 6 for a schematically indicated pull and push cable 7 which is driven by a motor or manual crank (not shown) and which is in engagement with a driving slide 8 to actuate the adjusting mechanism 4. The driving slide 8 is slidable back and forth within a guide track 9 of the guide rail 5 and carries on its rear side a set-out lever 10 having on its lower end a pivoting pin 11 projecting horizontally to both sides and allowing the set-out lever 10 to be received pivotally in a double peg fitting 12. This peg fitting 12 enables the set-out lever to be mounted to the driving slide 8 in a very simple manner, while the set-out lever 10 is reliably secured within the driving slide 8 because the peg fittings 12 are confined in vertical direction between the horizontal flanges of the guide track 9. On its generally upper end facing away from the pivot pin 11, the set-out lever 10 has a transverse pin 13 projecting horizontally to one side. This transverse pin 13 pivotally projects into a pivot cavity 14 of a cam 15 on a sliding plate 16 slidably connected to the panel 3. The slidability of the sliding plate 16 relative to the panel 3 is effected due to the cam 15 of the sliding plate 16 being slidably received within a slot 17 of a mounting section 18 onto which the panel 3 is fixedly mounted. Near its rear end the sliding plate 16 is slidably guided with respect to the mounting section 18 by interconnected flanges 19, 20 of the sliding plate 16 and the mounting section 18, respectively.

The sliding plate 16 of the panel 3 has near its rear end a curve 21 formed as a slot and in which a curve pin 22, mounted to the stationary guide rail 5, can engage when the panel is near or in its closed position. This curve pin 22 and curve 21 serve to reliably receive the panel 3 and to lock it in its closed position when the panel 3 is moved to its closed position. As a result there is assured a protection against burglary and a proper abutment of the panel to the seals (not shown). The curve 21 is open on its front end and has a backwardly and upwardly inclined portion 21' and a rearwardly joining horizontal locking portion 21".

The mounting section 18 and consequently the panel 3 has its front end pivotally connected to a front support 24 constructed as coupling arm by means of an horizontal transverse pivot 23. The front support 24 is slidably guided within the guide track 9 of the stationary guide rail 5 and has its rear end engaged both with the driving slide 8 and the guide rail 5.

The engagement between the front support 24 and the driving slide 8 takes place by means of a pin-slot connection of which a pin 25 is formed at the rear end of the front support 24, while the driving slide 8 is equipped with a control slot 26 extending at least partially heightwise. A relative movement between the pin 25 and the control slot 26 consequently results in a rotation of the front support 24 about a tilting cam 27. The displacement of the pin 25 of the front support 24 through the control slot 26 of the driving slide 8 is also determined by the engagement of a cam 28, which is aligned with pin 25 but which projects to the other side of the front support, into a backwardly and downwardly inclining cavity 29 of the guide rail 5 connecting to the guide track 9 of the guide rail 5. The crossing paths of the cavity 29 and the control slot 26 determine the relative displacement of the front support 24 and the driving slide 8. The cavity 29 is formed in an insert 30 of the stationary guide 5 which also includes a guide pin 31 adapted to cooperate with a guide slot 32 in the set-out lever 10 to form a forcing guide for the set-out lever 10 during a part of the pivoting movement thereof. This point will be reverted to in detail in the description of the operation. The guide slot 32 is open on both ends so that the guide pin 31 may pass through the guide slot 32 of the set-out lever 10.

The operation of the adjusting mechanism of the exemplary embodiment of the open roof construction according to the invention will hereafter be elucidated with reference to FIGS. 4-10 in particular.

FIG. 4 shows the position of the adjusting mechanism 4, in which the panel 3 is in its lower closed position within the roof opening 2. There the sliding plate 16 of the panel 3 is in its front position in relation to the mounting section 18. As a result the curve pin 22 is received within the horizontal locking portion 21" of the curve 21 in the sliding plate 16 thereby locking the panel 3 strongly in vertical direction. The cam 15 of the sliding plate 16 is with the transverse pin 13 of the set-out lever 10 at the front end of the slot 17 in the mounting section 18 of the panel 3. The pin 25 at the rear end of the front support 24 is in the highest position near the rear end of the control slot 26 in the driving slide 8 resulting in a solid lock of the pivot 23 and consequently the front side of the panel 3 in a lower sealing position. The set-out lever 10 is in the maximum downwardly pivoted position.

In FIG. 5 the driving slide 8 is slid a distance backwardly by the pull and push cable 7 (not shown). This sliding movement is transmitted to the sliding plate 16 by the set-out lever 10 so that also this sliding plate 16 is displaced rearwardly. The curve 21 is displaced with respect to the curve pin 22 so that the sliding plate is urged upwardly by the curve pin 22 during the displacement of the sliding plate 16 as a function of the path of the curve 21. As a consequence the rear side of the panel 3 moves upwardly and a first pivoting movement of the panel 3 is effected. Due to the pivoting movement of the mounting section 18 and the sliding plate 16, the set-out lever 10 will be pivoted upwardly during its rearward displacement. In the position of FIG. 5, the set-out lever 10 is adjusted such that the guide slot 32 of the set-out lever 10 has come to lie with its open rear end in front of the guide pin 31. The rear end of the front support 24 has moved slightly downwardly and backwardly during the rearward displacement of the driving slide 8 as a result of the movement of the pin 25 of the front support 24 through the control slot 26 and the movement of the cam 28 of the front support 24 through the cavity 29 of the stationary guide rail 5. The path of the control slot 26 determines the rotation of the front support 24 about the tilting cam 27, while the path of the cavity 29 effects a rearward displacement of the front support 24. Due to this rotational or tilting movement of the front support 24 and the rearward displacement thereof also the front pivot 23 and consequently the panel 3 undergoes a displacement, that is upwardly and backwardly. As a result it is possible to allow the front side of the panel 3 to pivot about a desired imaginary axis thereby providing a possible compensation of movements at the front side of the panel 3 as a result of the tilting movement thereof.

In FIG. 6 there is obtained the position in which the driving slide 8 and consequently the sliding plate 16 of the panel 3 is moved rearwardly to such an extent that the curve pin 22 has come out of engagement with the curve 21. Then the guiding of the panel by the catching device formed by the curve 21 and the curve pin 22 has terminated. In the meantime, the guide pin 31 of the stationary guide rail 5 has fully entered the guide slot 32 of the set-out lever 10 thereby ensuring a very stable guide and support of the set-out lever 10. The position of the set-out lever 10 is no longer determined by the tilting movement of the panel 3 as a result of the engagement of the curve pin 22 in the curve 21 of the sliding plate 16 of the panel 3 but by the relative paths of the guide slot 32 of the set-out lever 10 along the guide pin 31 of the stationary guide rail 5 when the lower pivot pin 11 of the set-out lever 10 is moved through the driving slide 8. In the position of FIG. 6, the pin 25 of the front support 24 has been moved further through the control slot 26 in the driving slide 8 and the cam 28 has lowered further within the cavity 29 so that a further correction of the pivot 23 has taken place.

In the position of FIG. 7, the driving slide 8 is again displaced further backwardly. The displacement of the lower pivot pin 11 of the set-out lever 10 relative to the guide pin 31 has resulted in a relative displacement of the guide pin 31 and the guide slot 32 of the set-out lever and the path of the guide slot 32 has led to a pivoting movement of the set-out lever 10 and consequently to a tilting movement of the panel 3. The upper transverse pin 13 of the set-out lever 10 together with the cam 15 of the sliding plate 16 is moved further backwardly through the slot 17 of the mounting section 18 and has reached the rear end thereof. A locking means (not further shown) prevents a return movement of the transverse pin 13 of the set-out lever 10. A further rearward displacement of the driving slide 8 from the position of FIG. 7 will therefore cause the set-out lever 10 to pivot only by the rearward displacement of the lower pivot pin 11, because the guide pin 31 of the stationary guide rail 5 has reached an inoperative portion of the guide slot 32 in the set-out lever 10 which is formed concentrically about the upper transverse pin 13. The front support 24 is further tilted and slid rearwardly due to the displacement of the pin 25 through the control slot 26 of the driving slide 8 and the displacement of the cam 28 through the cavity 29 in the stationary guide. It is noted that the movements of the pivot 23 of the front support 24 are only very small.

Figure 8:
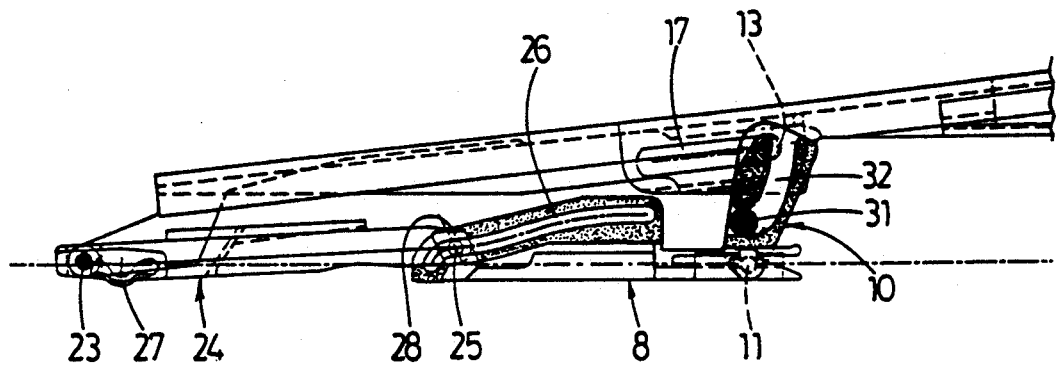

In FIG. 8, the driving slide 8 is displaced rearwardly to such extent that the guide slot 32 of the set-out lever 10 has nearly passed the guide pin 31 and the set-out lever 10 has almost reached its upper position due to the rearward sliding movement of its lower pivot pin 11. The front support 24 is tilted further back by a downward and backward displacement of the rear end of the front support 24 at a position of the pin 25 and the cam 28.

Figure 9:
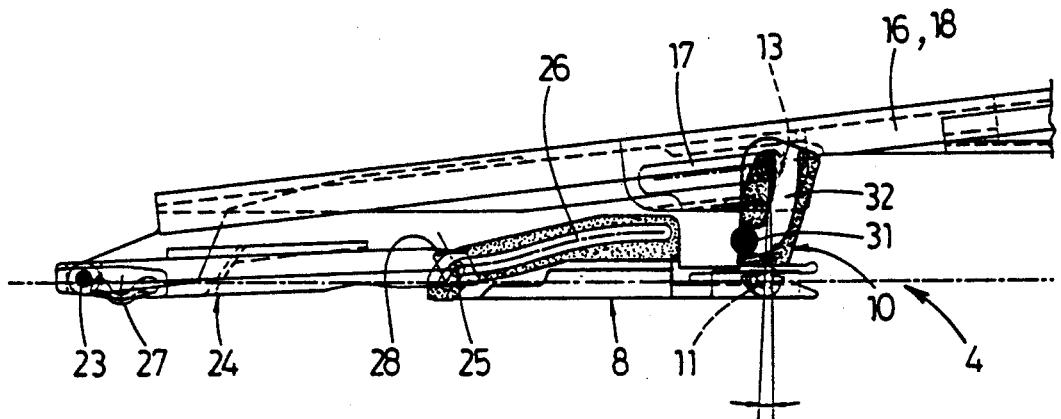
Figure 10:
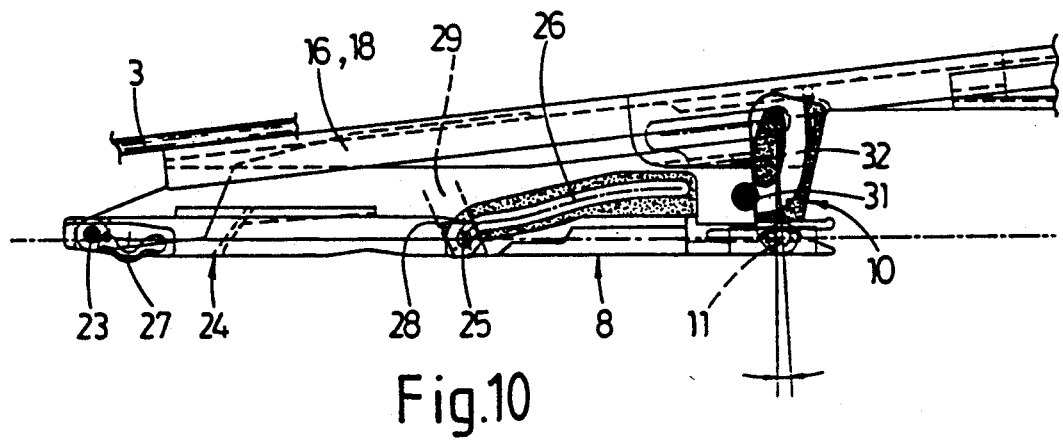

FIGS. 9 and 10 resp. show the position of the adjusting mechanism 4 just before and when the panel 3 reaches the maximum upwardly tilted position. Between the positions of FIGS. 9 and 10 the set-out lever 10 just pivots through the vertical position (determined by the pivot pins 11 and 13) as indicated by the angles in FIGS. 9 and 10. During this pivoting movement of the set-out lever 10 the position of the mounting section 18 and consequently of the panel 3 hardly ever changes when there is a certain sliding movement of the driving slide 8. This has the advantage that the automatic stop in the maximum tilting position of the panel 3, which is often used in electrically driven spoiler roofs, is not very critical as to the stop position of the driving slide 8 because the position of the panel 3 hardly changes in this displacement region of the driving slide 8. A further pivoting movement of the set-out lever 10 beyond the position of FIG. 10 is not possible because the set-out lever 10, the panel 3 and the driving slide 8 form a fixed triangle together with the front support.

The cam 28 at the rear end of the front support 24 has then left the cavity 29 and has entered the guide track 9 of the guide rail 5 below the respective horizontal flange.

From the position of FIG. 10, the driving slide 8 may be displaced further rearwardly by means of the pull and push cable 7 thereby causing the panel 3 to come to lie further rearwardly in positions above the fixed roof 1 behind the roof opening 2 in the same pivotal position. In this position the panel 3 is supported in a stable manner by the set-out lever 10 because the set-out lever 10 is oriented substantially perpendicularly to the panel 3. The driving slide 8 and the front support 24 are locked with respect to each other since the cam 28 of the front support 24 is confined in vertical direction within the guide track 9 of the guide rail 5 and as a result thereof the pin 25 is also locked in longitudinal direction within the steep portion of the control slot 26 of the driving slide 8.

From the foregoing it will be clear that the invention provides a stable support of the panel 3 in any position thereof. Due to the correct and solid guide of the set-out lever 10 by means of the forcing guide 31, 32, the set-out lever 10 can be positioned far forwardly thereby enabling a large rearward displacement of the adjusting mechanism 4 resulting in the roof opening 2 being opened to a great extent. Furthermore, the stable guide and support of the set-out lever 10 enable the set-out lever 10 to quickly take over the function of the catching device 21, 22 at the rear side of the panel 3 when this is opened, as a result of which the catching device may be kept small in vertical direction and as a consequence the building height of the whole open roof construction is not adversely effected by the catching device.

The invention is not restricted to the embodiment shown in the drawing and described herein before by way of example, which may be varied in different manners within the scope of the invention. As an example it is possible to mount the guide pin 31 to another fixed part rather than the stationary guide rail 5, for example to a stationary frame. Furthermore, it is conceivable that the forcing guide is operative between the set-out lever 10 and the panel 3 or the mounting section 18, respectively.

I claim:

1. An open roof construction for a vehicle having an opening (2) in the fixed roof (1), comprising an adjustable panel (3) closing the opening (2) in the fixed roof (1) in a closed position and being adapted to be moved first to a backwardly and upwardly inclined position and then backwardly to positions above the fixed roof (1) by means of an adjusting mechanism (4), the adjusting mechanism including a transverse pivot shaft (23) pivotally supporting the panel (3) at a front side, a set-out lever (10) spaced backwardly from the pivot shaft (23), the set-out lever (10) being pivotally connected to the panel (3) on an upper end and being pivotally in driven connection to a driving slide (8) on a lower end, the driving slide (8) being slidably guided within a stationary guide rail (5) extending in longitudinal direction of the vehicle and with which a driving means engages, a catching device (16, 21, 22) positioned backwardly of the set-out lever (10) between the panel (3) and the stationary guide rail (5) for pivoting the panel (3) from and to the closed position, wherein the set-out lever (10) includes forcing guide means (31, 32) for camming pivoting movements of the set-out lever (10) during at least a part of the pivoting movement of the panel (3) when the catching device (16, 21, 22) is not pivoting the panel (3).

2. The open roof construction according to claim 1, wherein the forcing guide means (31, 32) operates between the set-out lever (10) and a stationary part (30).

3. The open roof construction according to claim 2, wherein the stationary part (30) is connected to the stationary guide rail (5).

4. The open roof construction according to claim 3, wherein the forcing guide means (31, 32) includes a guide slot (32) having two open ends and being formed within the set-out lever (10), and a guide pin (31) fitting into the guide slot (32) and being fixed to the stationary guide rail (5).

5. The open roof construction according to claim 1, wherein the catching device includes a sliding plate (16) slidably connected to the panel (3) and adjustable by the drive means (8) through the set-out lever (10) and having a slot (21) extending at least partially heightwise, and a pin (22) fixed to the stationary guide rail (5) engages in the slot (21) for pivoting the panel (3) from and to the closed position.

6. An open roof construction for a vehicle having an opening (2) in the fixed roof (1), comprising an adjustable panel (3) closing the opening (2) in the fixed roof (1) in a closed position and being adapted to be moved first to a backwardly and upwardly inclined position and then backwardly to positions above the fixed roof (1) by means of an adjusting mechanism (4), the adjusting mechanism including a transverse pivot shaft (23) pivotally supporting the panel (3) at a front side, a set-out lever (10) spaced backwardly from the pivot shaft (23), the set-out lever (10) being pivotally connected to the panel (3) on an upper end and being pivotally in driven connection to a driving slide (8) on a lower end, the driving slide (8) being slidably guided within a stationary guide rail (5) extending in longitudinal direction of the vehicle and with which a driving means engages, a catching device (16, 21, 22) positioned backwardly of the set-out lever (10) between the panel (3) and the stationary guide rail (5) for pivoting the panel (3) from and to the closed position, wherein the set-out lever (10) includes a forcing guide (31, 32) comprising a guide slot (32) having two open ends and being formed with the set-out lever (10), and a guide pin (31) fitting into the guide slot (32) and being fixed to the stationary guide rail (5), the forcing guide (31, 32) operating between the set-out lever (10) and the stationary guide rail (5) and forcibly guiding movement of the set-out lever 10 during at least a part of the pivoting movement of the panel (3) when the catching device (16, 21, 22) is not pivoting the panel (3).

7. The open roof construction according to claim 6, wherein the catching device includes a sliding plate (16) slidably connected to the panel (3) and adjustable by the drive means (8) through the set-out lever (10) and having a slot (21) extending at least partially heightwise, and a pin (22) fixed to the stationary guide rail (5) and adapted to engage in the slot (21).

8. An open roof construction for a vehicle having an opening (2) in the fixed roof (1), comprising and adjustable panel (3) closing the opening (2) in the fixed roof (1) in a closed position and being adapted to be moved first to a backwardly and upwardly inclined position and then backwardly to positions above the fixed roof (1) by means of an adjusting mechanism (4), the adjusting mechanism including a transverse pivot shaft (23) pivotally supporting the panel (3) at a front side, a set-out lever (10) spaced backwardly from the pivot shaft (23), the set-out lever (10) being pivotally connected to the panel (3) on an upper end and being pivotally in driven connection to a driving slide (8) on a lower end, the driving slide (8) being slidably guided within a stationary guide rail (5) extending in longitudinal direction of the vehicle and with which a driving means engages, a catching device (16, 21, 22) positioned backwardly of the set-out lever (10) between the panel (3) and the stationary guide rail (5) for pivoting the panel (3) from and to the closed position, wherein the set-out lever (1) includes a forcing guide (31, 32) which forcibly guides movement of the set-out lever 10 during at least part of the pivoting movement of the panel (3) when the catching device (16, 21, 22) is not pivoting the panel (3), and wherein the catching device includes a sliding plate (16) slidably connected to the panel (3) and adjustable by the drive means (8) through the set-out lever (10) and having a slot (21) extending at least partially heightwise, and a pin (22) fixed to the stationary guide rail (5) and adapted to engage in the slot (21).

9. The open roof construction according to claim 8, wherein the forcing guide (31, 32) operates between the set-out lever (10) and a stationary part (30).

10. The open roof construction according to claim 9, wherein the stationary part (30) is connected to the stationary guide rail (5).

11. The open roof construction according to claim 10, wherein the forcing guide (31, 32) includes a guide slot (32) having two open ends and being formed within the set-out lever (10), and a guide pin (31) fitting into the guide slot (32) and being fixed to the stationary guide rail (5).

* * * * *

UNITED STATES PATENT AND TRADEMARK OFFICE
CERTIFICATE OF CORRECTION

PATENT NO. : 5,288,125
DATED : February 22, 1994
INVENTOR(S) : Johannes N. Huyer It is certified that error appears in the above-indentified patent and that said Letters Patent is hereby corrected as shown below:

Col. 7, line 12 cancel "with" and insert --within--.

Col. 8, line 12 cancel "(1)" and insert --(10)--.

Col. 8, line 14 cancel "10" and insert --(10)--.

Signed and Sealed this

Eighth Day of November, 1994

Attest:

BRUCE LEHMAN

*Attesting Officer*  *Commissioner of Patents and Trademarks*